(12) United States Patent
Kawasaki

(10) Patent No.: US 6,625,983 B2
(45) Date of Patent: Sep. 30, 2003

(54) HYDRAULIC POWER SYSTEM

(76) Inventor: Kim Kawasaki, 12868 Brady Rd., Jacksonville, FL (US) 32223

( * ) Notice: Subject to any disclaimer, the term of this patent is extended or adjusted under 35 U.S.C. 154(b) by 0 days.

(21) Appl. No.: 10/085,215

(22) Filed: Mar. 1, 2002

(65) Prior Publication Data

US 2002/0129601 A1 Sep. 19, 2002

Related U.S. Application Data

(60) Provisional application No. 60/272,556, filed on Mar. 1, 2001.

(51) Int. Cl.$^7$ ................................................. F16D 31/02
(52) U.S. Cl. ............................. 60/468; 60/473; 60/476; 60/486
(58) Field of Search .......................... 60/468, 473, 475, 60/476, 486, 494

(56) References Cited

U.S. PATENT DOCUMENTS

| | | | | |
|---|---|---|---|---|
| 3,903,698 A | * | 9/1975 | Gellatly et al. | ................ 60/476 |
| 4,627,239 A | * | 12/1986 | Nishimune et al. | ........... 60/486 |
| 5,301,505 A | * | 4/1994 | Wright | ......................... 60/405 |
| 5,988,989 A | * | 11/1999 | Hobson | ........................ 60/481 |

* cited by examiner

Primary Examiner—Edward K. Look
Assistant Examiner—Thomas E. Lazo
(74) Attorney, Agent, or Firm—Thomas C. Saitta

(57) ABSTRACT

An hydraulic power system having a reversible motor operating a pump to deliver liquid under pressure to operate an actuator mechanism, where the motor is submerged within the liquid inside a reservoir. Flow direction of the liquid is controlled by alternating the direction of rotation of the motor and pump.

18 Claims, 5 Drawing Sheets

HYDRAULIC POWER SYSTEM

This application claims the benefit of U.S. Patent Application Ser. No. 60/272,556, filed Mar. 1, 2001.

BACKGROUND OF THE INVENTION

The invention relates to the field of hydraulic power systems, where an actuator mechanism such as a piston or an hydraulic motor is operated by delivery of a fluid under pressure, typically an oil pressurized and delivered by a power source such as an electric motor pump.

A standard hydraulic power system comprises a reservoir, an electrically powered pump, a filter, a relief valve, an accumulator, a pressure regulator or cut-out valve or switch, and a check valve, all linked in fluid communication by suitable conduits. The reservoir contains a supply of liquid to be delivered by the pump, which is usually light mineral oil or castor-based oil, and also accommodates the returning liquid from the actuator mechanism. Such oils have a low freezing point and additionally serve as lubricants for the system. Specialty hydraulic oils possessing various desirable characteristics are well known in the industry. The pump is connected or formed as part of an electric motor and provides pressure to deliver the liquid as desired. Well known types of pumps include gear pumps or radial cylinder pumps. The filter is typically disposed in the suction line which draws oil from the reservoir either immediately before or after the pump and ensures the liquid remains free from foreign matter. The accumulator is a secondary storage chamber of variable volume which smooths out pressure fluctuations and ensures a steady build-up in addition to storing liquid under pressure for emergency or supplementary use. The cut-out valve automatically bypasses the actuator mechanism and delivers the high-pressure liquid back to the reservoir when a maximum pressure is reached. The check or non-return valve prevents liquid from leaking back when the cut-out valve is actuated. The relief valve is a redundant safety feature in the event the cut-out valve fails to operate properly. The hydraulic power system delivers the liquid under pressure to different actuator mechanisms, such as a selector valve, jack, piston, motor or other device which operates a particular piece of equipment or the like.

Conventional hydraulic systems, and especially those used to operate large equipment or other heavy duty mechanisms, suffer from numerous drawbacks. The systems are usually noisy and very energy inefficient, drawing excessive current and thereby increasing operating costs. The system components occupy a relatively large volume and footprint. As the pumps are usually operational only at full power, they are difficult to fine tune for precise load delivery and difficult to power down to deliver low amounts of pressure. The flow varies with each cycle. The power sources produce large amounts of waste heat, thereby requiring the addition of large external air blowers or fans to remove excess heat from the power source to prevent over-heating problems. Directional control of the fluid supply requires the use of a directional control valve, typically of a solenoid-type, which are susceptible to failure.

It is an object of this invention to provide an hydraulic power system for operating an hydraulic actuator mechanism which reduces or eliminates the above referenced problems, by providing a system which is compact, has excellent heat transfer characteristics such that no external air cooling devices are required, can be stacked or connected in parallel to selectively increase horsepower, is controlled electronically to adjust the speed of the motor to provide the flow and pressure which matches the load, which provides for redundant power sources in the event a single power source fails, and which is usable in cold climates without the need for preheating of the fluid. It is a further object to provide such a system which is low cost yet provides multiple speed, flow, load and horsepower options, which is relatively small in size relative to its output, and is very quiet. It is a further object to provide such a system which does not require an electrical solenoid valve as a selector valve for reversing flow direction, such that the rotation of the motor itself determines the flow path to the actuator mechanism. These and other objects will be apparent from review of the following disclosure.

SUMMARY OF THE INVENTION

The invention is in a most general sense an hydraulic power system comprising a bi-directional or reversible electric motor pump for pressurizing and inducing flow in a liquid to operate an actuator mechanism, such as a piston within a cylinder, hydraulic motor or the like, where the motor pump is immersed in the liquid within the storage and return reservoir, the liquid acting as a heat transfer means to maintain the motor within operational parameters without the need for extraneous cooling mechanisms, blowers or the like. In a further general sense, the invention is an hydraulic power system where the flow direction of the hydraulic power system is controlled by the direction of rotation of the motor and pump without the need for an electrically operated directional control valve. In a further general sense, the invention is an hydraulic power system where multiple individual power systems may fluidly connected in parallel in order to control or vary the horsepower produced by the total system dependent on need and to provide redundancy to the system in the event of the failure of an individual power system.

The invention comprises in a more detailed sense a reservoir, such as a tank or drum, which retains a liquid suitable for hydraulic applications, such as an oil or known hydraulic fluid. The liquid is pressurized and flow is induced by an electrically powered reversible motor and pump combination, and the motor and pump are immersed in the liquid within the reservoir, which is sealed but provided with a pair of delivery/return ports for flow of hydraulic fluid in either direction. A flow directional control means comprising a pair of suction conduits and one-way check valves is provided in fluid communication with the liquid in the reservoir and with the pump, such that rotation of the pump in a first direction will draw fluid through one of said suction conduits to deliver the fluid out of the reservoir through one of said delivery/return conduits to an actuator mechanism, with fluid returning back into the reservoir through the other of said delivery/return conduits, and vice-versa when the rotation of the pump is in the opposite direction. The rotation speed of the motor and pump combination is electronically controlled. Relief valves are provided to prevent overload of the system, and a differential flow control valve is provided to balance the flow as the actuator mechanism moves under the induced pressure from the hydraulic fluid.

Multiple motor and pump combinations may be immersed in a single reservoir and connected in parallel, or multiple reservoirs with motor and pump combinations may be connected in parallel, with all motor and pumps controlled electronically, such as through a microprocessor, such that the overall output power of the multiple systems can be readily varied as required by load or demand.

DETAILED DESCRIPTION OF THE INVENTION

Figure 1:
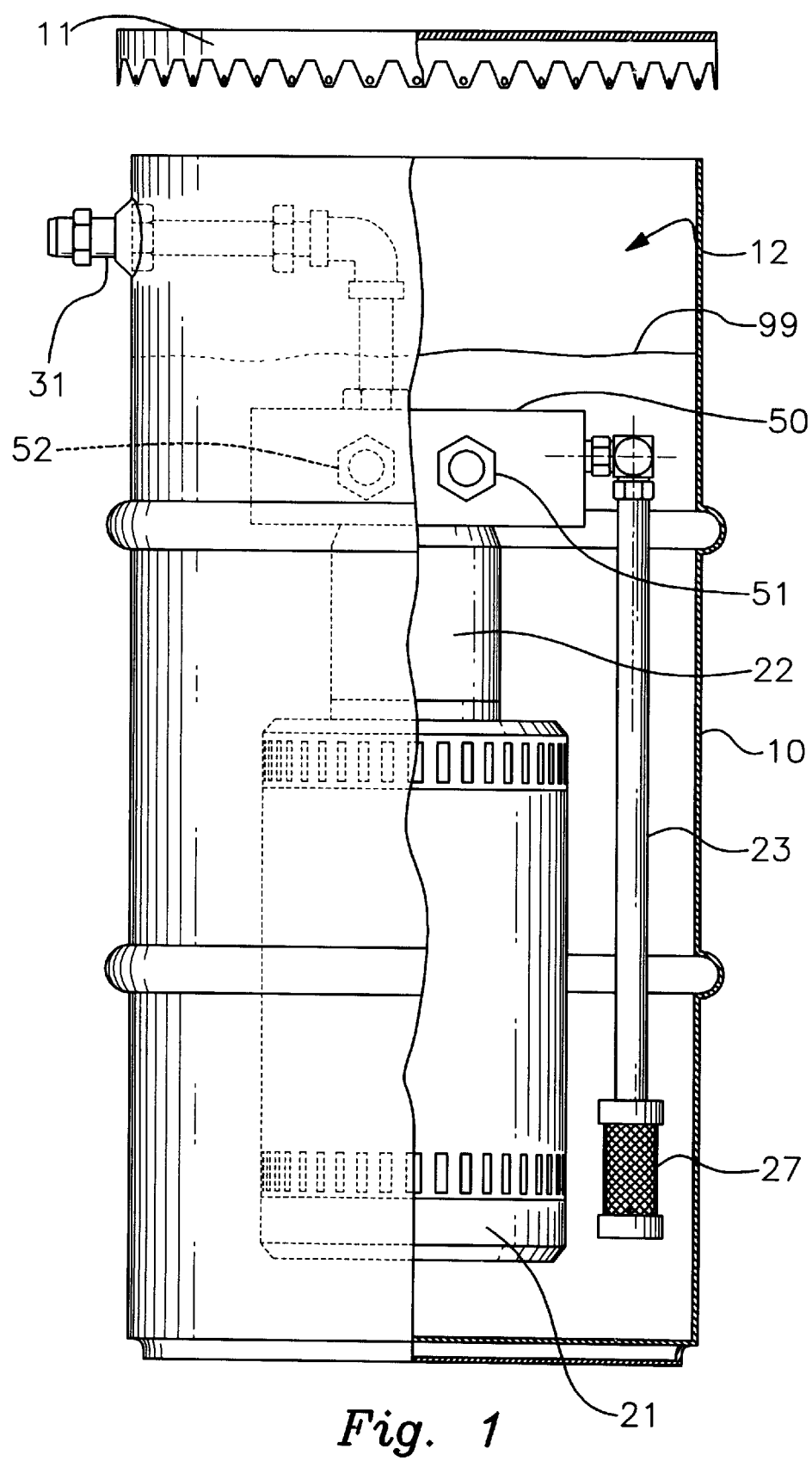
FIG. 1 is a partially exposed view of the motor/pump combination as submerged in a drum reservoir.

With reference to the drawings, the invention will now be described in detail with regard for the best mode and the preferred embodiment. In general, the invention is an hydraulic power system which delivers liquid under pressure through conduits to an actuator mechanism to be operated, such as a piston-cylinder combination, an hydraulic motor or the like.

As seen in FIGS. 1 through 4, the invention is generally self-contained and occupies a relatively small volume of space. The operational components are contained within a reservoir 10 defining an interior 12 and with a removable lid 11 or other access means to the interior 12. The reservoir 10 retains the liquid or hydraulic fluid 99, which is an oil or other type of hydraulic fluid suitable for this application. The reservoir 10 is illustrated as a drum, such as commonly made from metal or plastic, but the reservoir 10 could also be a container having a square, rectangular or other shape. With the lid 11 in place, the reservoir 10 is sealed except for a pair of delivery/return ports or conduits 53 and 54 which provide a liquid communicating pathway from the reservoir interior 12 to an actuator mechanism 90 and back. As shown in the illustration, the actuator mechanism 90 comprises a piston 91 within a cylinder 92, but the actuator mechanism 90 can be any other type of hydraulically-operated mechanism, such as an hydraulic motor or the like. The main operational components of the hydraulic power system comprise an electric motor 21 capable of rotation in opposite directions, the motor 21 combined with or connected to a pump 22 for pressurizing and moving the hydraulic fluid 99. Such motor 21 and pump 22 combinations are well known in the art. The pump 21 delivers liquid 99 under pressure through either the first delivery/return conduit 31 or the second delivery/return conduit to operate the actuator mechanism 90, dependent on the direction of rotation of the motor 21. The level of liquid 99 within the reservoir 10 is maintained such that at least the motor 21 is always submerged beneath the surface of the liquid 99, since the liquid 99 acts as a heat dissipater to maintain the motor 21 within safe operational temperature values. Various flow control elements are disposed within a flow control block 50 in order to properly direct the delivery and return of the fluid 99, and to prevent the build-up of excessive pressure and to balance the flow during operation.

Figure 2:
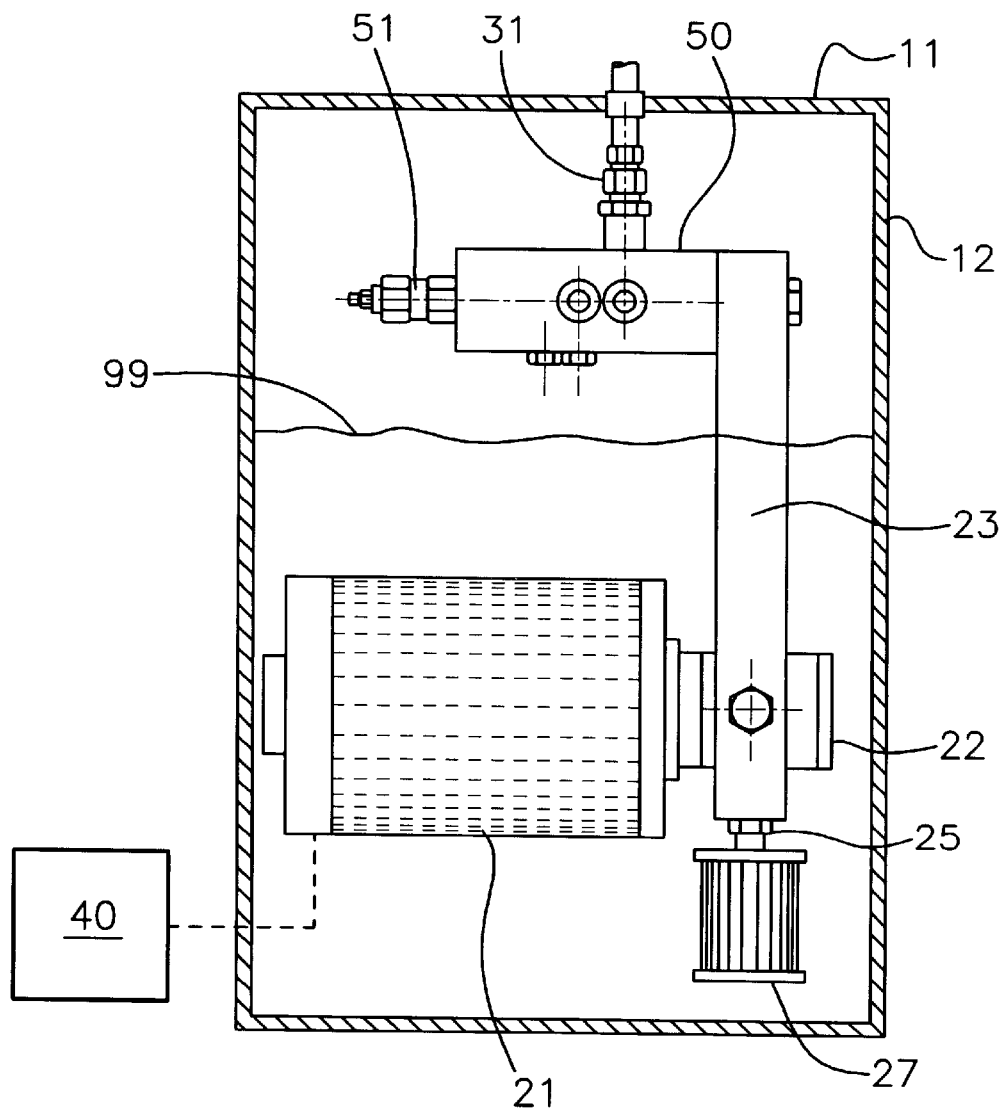
FIG. 2 is a partial side view showing an alternative assembly for the power system.
Figure 3:
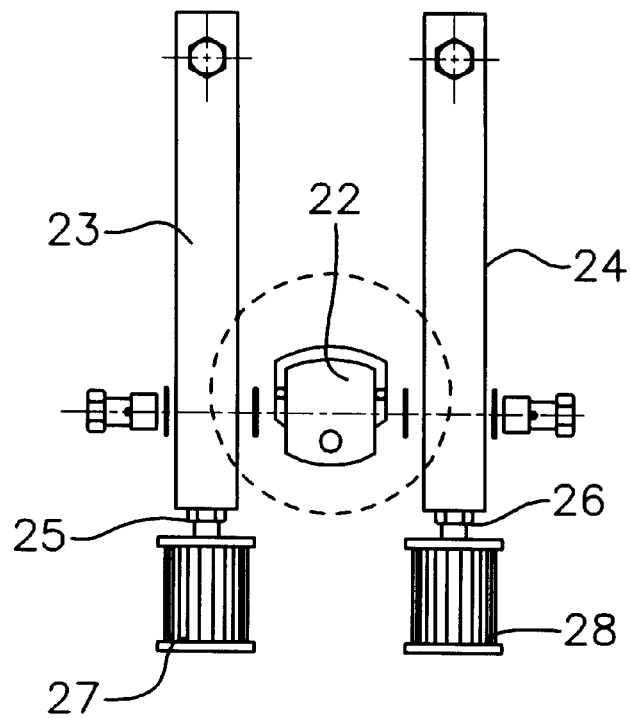
FIG. 3 is a partial front view showing the two suction conduits, filters and pump.
Figure 4:
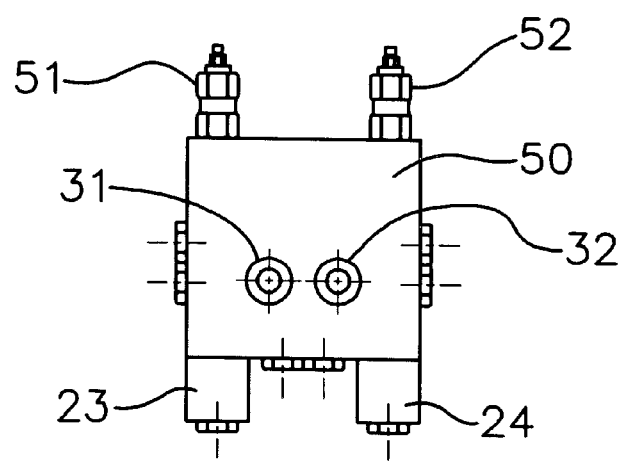
FIG. 4 is a top view of the flow control block of FIG. 2.

A more preferred embodiment is illustrated in FIGS. 2 through 4. Whereas in FIG. 1 the pump 22 is mounted in communication with the flow control block 50, in this embodiment the motor 21 and pump 22 are mounted such that the pump 22 is disposed between a first suction conduit 23 and a second suction conduit 24. A first filter 27 is mounted onto the first suction conduit 23 and a second filter 28 is mounted onto the second suction conduit 24 in order to prevent any impurities from being drawn into the system. First suction conduit 23 is also provided with a first check valve 25 and second suction conduit 24 is provided with a second check valve 26 such that flow through each suction conduit 23 and 24 can only occur in the direction toward the flow control block 50. Extending from the flow control block 50 are a first delivery/return conduit 31 and a second delivery return conduit 32, as seen best in FIG. 4. The first and second delivery/return conduits 31 and 32 are connected in fluid communicating manner to the actuator mechanism 90. Pressure relief means, such as a first pressure relief valve 51 and a second pressure relief valve 52 are also disposed in the flow control block 50, and provide means for return of hydraulic fluid 99 to the reservoir 10 from the actuator mechanism 90 and provide a safety release in the event that maximum safe pressures are exceeded in the system, the relief valve 51 or 52 opening to reduce the pressure if necessary.

Figure 5:
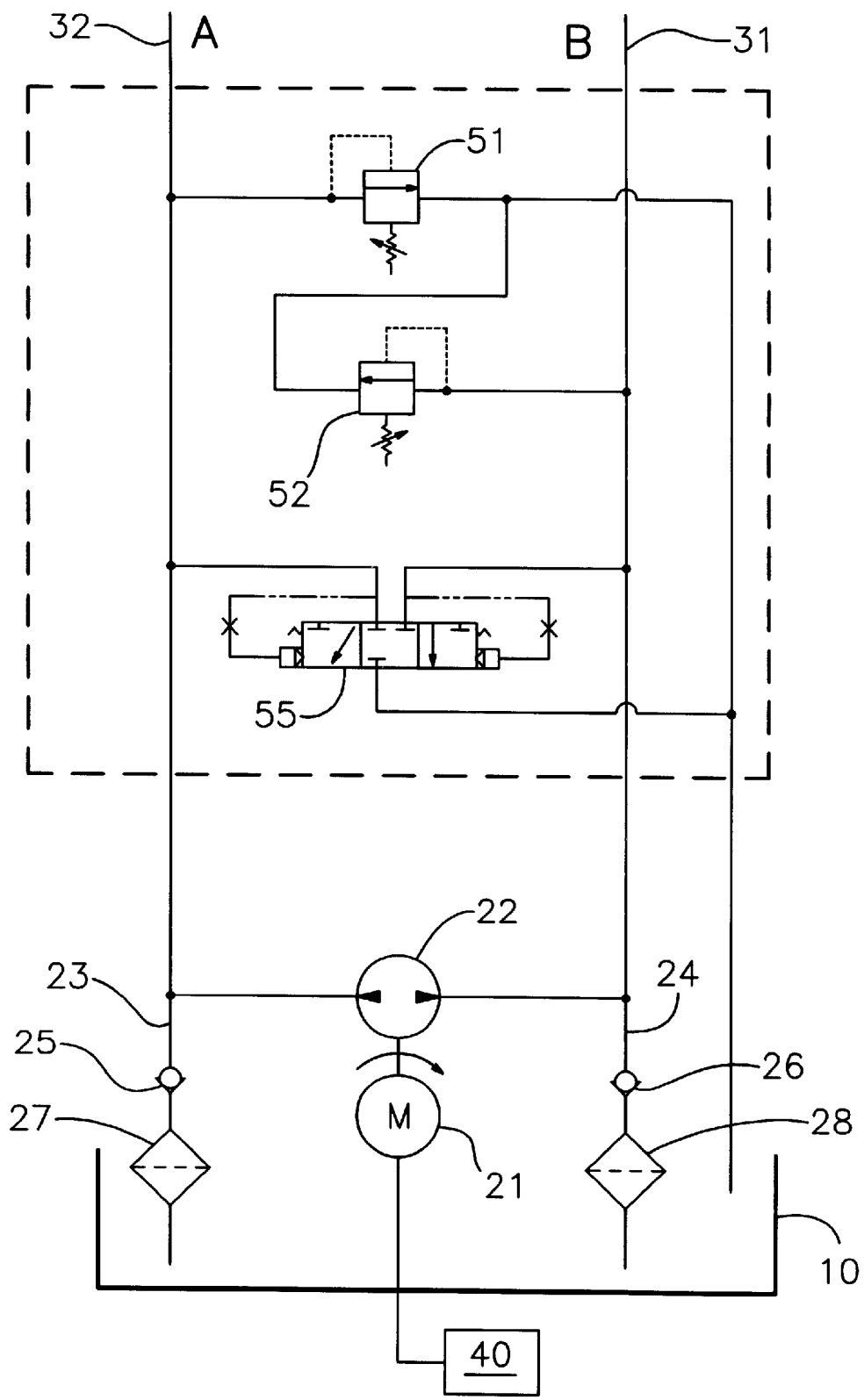
FIG. 5 is a schematic illustrating the components and flow paths of the system.

FIG. 5 illustrates the flow paths and components of the preferred embodiment of the invention. The reversible motor 21 is controlled by operational control means 40, which may comprise a microprocessor or any other suitable means for activating and reversing the rotational direction of the motor 21. The operational control means 40 may be disposed externally to the reservoir 10 or may be mounted within the reservoir 10. The motor 21 operates the pump 22, which is fluidly connected to the pair of suction conduits 23 and 24, which draw liquid 99 from the reservoir 10. Each suction conduit 23 and 24 is provided, with a one-way check valve 25 and 26, such that flow can only occur in the direction from the reservoir 10 to the pump 22. With the motor 21 and pump 22 rotating in a first direction, liquid 99 is drawn through the first suction conduit 23 and delivered under pressure to the actuator mechanism 90 through the first delivery/return conduit 31. Liquid 99 returns from the actuator mechanism 90 through the second delivery/return conduit 32 and flows back into the reservoir 10. The second check valve 26 in the second suction conduit 24 prevents liquid 99 from being forced back into the reservoir 10 through the second suction conduit 24 during rotation of the motor 21 in the first direction.

With the motor 21 and pump 22 reversed in the opposing or second direction, the liquid 99 is now drawn through the second suction conduit 24 and delivered to the actuator mechanism 90 through the second delivery/return conduit 32. Liquid 99 is returned from the actuator mechanism 90 to the reservoir 10 through the first delivery/return conduit 31. The first check valve 25 in the first suction conduit 23 prevents liquid 99 from being forced back into the reservoir 10 through the first suction conduit 23 during rotation of the motor 21 in this second direction. The rotational direction of the motor 21 can be alternated very rapidly in order to drive the actuator mechanism at high speed.

Figure 6:
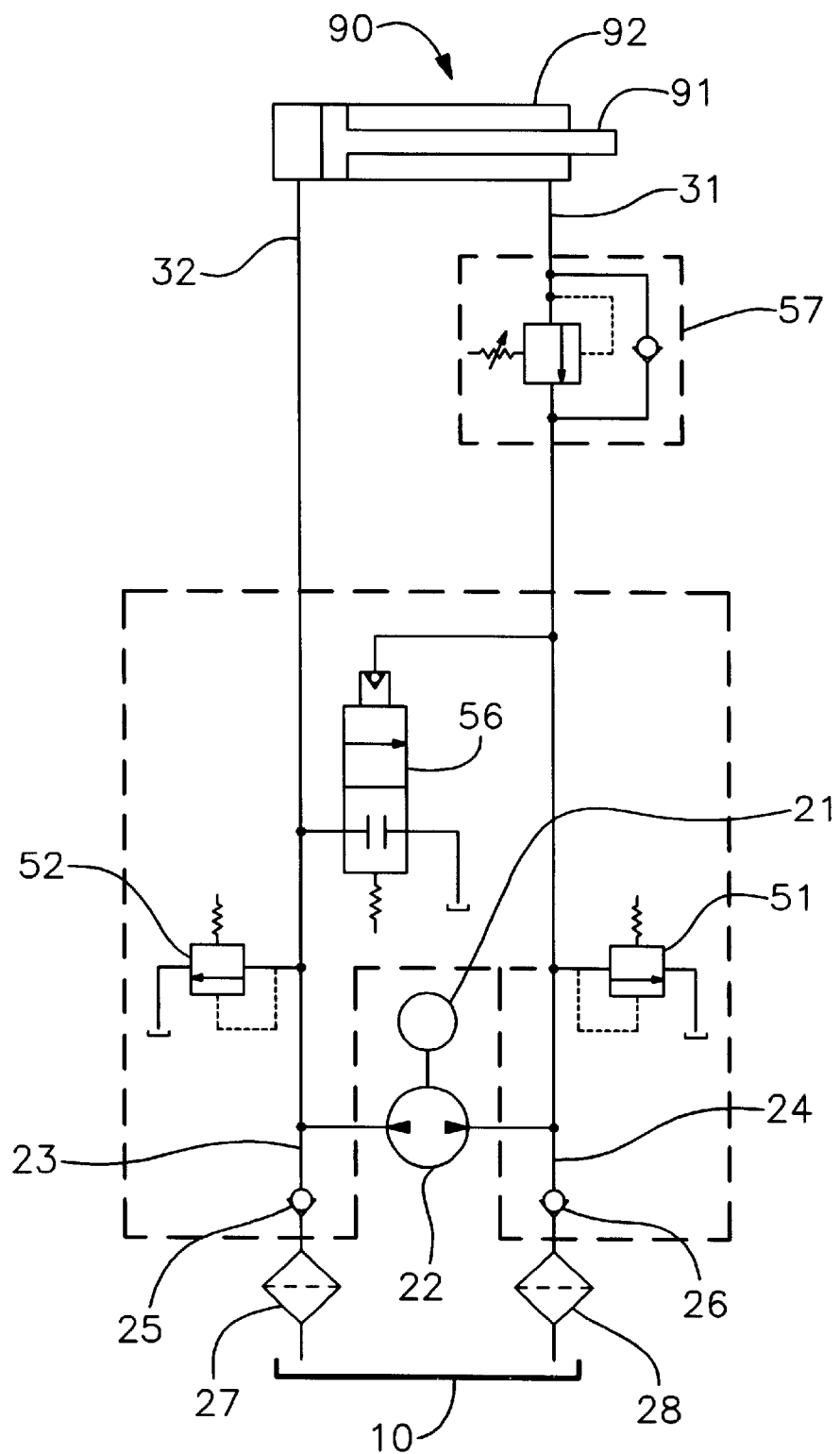
FIG. 6 is a schematic illustrating alternative components and flow paths for a second embodiment of the invention.

In order to balance flow as the actuator mechanism moves and reverses direction, or as loads change, means to balance the flow such as a differential flow control valve 55 of known type is disposed in line. In an alternative embodiment as shown in FIG. 6, a shuttle valve 56 of known type is provided to balance excess fluid when the flow direction is reversed. An optional counterbalance valve 57 of known type may be provided to lock the actuator mechanism 90 in a given position.

The hydraulic power system constructed as described enables a plural number of hydraulic power systems to be connected in parallel manner. Multiple power system units may be contained in a single reservoir 10, or each unit may be set up with its own reservoir 10. Where a single system may be designed to produce from 5 to 10 horsepower, plural units can be connected in parallel to deliver multiples of horsepower, such that 10 units may deliver from 5 to 100 horsepower, for example, dependent on how many individual units are set into operation.

With single or multiple hydraulic power systems, the operation is most preferably controlled by operational control means 40 comprising a microprocessor or, other computer system, which is programmed to control the flow direction and the number of units activated to perform tasks where the flow and pressure requirements vary relative to the mechanism or mechanisms 90 being operated. Thus, for multiple systems containing 10 individual systems, the computer may activate any number of individual systems from 1 to 10 as required. This enables the system to deliver very precise and differing power amounts. Furthermore, if one individual system fails, then another may be activated, thereby providing built-in redundancy.

Because the motor 21 is submerged in the liquid 99 in the reservoir 10, the waste heat generated by the motor 21 is absorbed by the liquid 99, where it is dissipated through the walls of the reservoir 10. Thus no external cooling mechanisms, such as fans or blowers, are required to keep the motor 21 operating within acceptable temperature levels. Furthermore, in cold climates, the waste heat from the motor 21 maintains the liquid 99 at an elevated temperature, such that no additional heating mechanisms are required to maintain the liquid 99 above a suitable temperature for optimum flow characteristics.

The system is very compact and completely sealed, such that degradation effects from environmental factors such as dirt, rain, etc. are eliminated. The liquid 99 in the reservoir 10 also acts to muffle the noise produced by the motor 21 and pump 22, making the system very quiet in operation.

It is contemplated that substitutions and equivalents for certain components set forth above may be obvious to those skilled in the art, and therefore the true scope and definition of the invention is to be as set forth in the following claims.

I claim:

1. An hydraulic power system for operating an actuator mechanism comprising:
   a reservoir retaining an hydraulic fluid;
   an electrically powered reversible motor having a first direction of rotation and a second direction of rotation, wherein said motor is submerged in said hydraulic fluid within said reservoir, said hydraulic fluid acting as a heat dissipater for heat created by said motor;
   a pump driven by said motor for removing said hydraulic fluid from said reservoir and delivering said hydraulic fluid to an actuator mechanism;
   a first suction conduit and a second suction conduit for removing said hydraulic fluid from said reservoir, wherein the direction of rotation of said motor determines whether said hydraulic fluid is drawn through said first suction conduit or said second suction conduit;
   a first deliver/return conduit and a second delivery/return conduit for delivering said hydraulic fluid from said reservoir to said actuator mechanism, wherein the direction of rotation of said motor determines whether said hydraulic fluid is delivered through said first deliver/return conduit or said second delivery/return conduit and
   means to balance the flow of said hydraulic fluid when said direction of rotation is changed.

2. The system of claim 1, further comprising operational control means for controlling said direction of rotation of said motor, wherein said operational control means comprises a microprocessor.

3. The system of claim 1, further comprising a first check valve and a second check valve, wherein said first check valve prevents reverse flow of said hydraulic fluid through said first suction conduit and said second check valve prevents reverse flow of hydraulic fluid through said second suction conduit.

4. The system of claim 3, further comprising pressure relief means to release hydraulic fluid into said reservoir if said system is over-pressurized.

5. The system of claim 4, wherein said pressure relief means comprises a first pressure relief valve and a second pressure relief valve, wherein said first pressure relief valve communicates with said first delivery/return conduit and said second pressure relief valve communicates with said second delivery/return conduit.

6. The system of claim 4, wherein said means to balance flow comprises a differential flow control valve.

7. The system of claim 3, wherein said means to balance flow comprises a differential flow control valve.

8. The system of claim 1, further comprising pressure relief means to release hydraulic fluid into said reservoir if said system is over-pressurized.

9. The system of claim 8, wherein said pressure relief means comprises a first pressure relief valve and a second pressure relief valve, wherein said first pressure relief valve communicates with said first delivery/return conduit and said second pressure relief valve communicates with said second delivery/return conduit.

10. The system of claim 1, wherein said means to balance flow comprises a differential flow control valve.

11. The system of claim 1, wherein said means to balance flow comprises a shuttle valve.

12. The system of claim 1, further comprising a counterbalance valve to lock said actuator mechanism.

13. An hydraulic power system for operating an actuator mechanism comprising:
    a reservoir retaining an hydraulic fluid;
    an electrically powered reversible motor having a first direction of rotation and a second direction of rotation, wherein said motor is submerged in said hydraulic fluid within said reservoir, said hydraulic fluid acting as a heat dissipater for heat created by said motor;
    operational control means for controlling said direction of rotation of said motor, wherein said operational control means comprises a microprocessor;
    a pump driven by said motor for removing said hydraulic fluid from said reservoir and delivering said hydraulic fluid to an actuator mechanism;
    a first suction conduit and a second suction conduit for removing said hydraulic fluid from said reservoir, wherein the direction of rotation of said motor determines whether said hydraulic fluid is drawn through said first suction conduit or said second suction conduit;
    a first check valve and a second check valve, wherein said first check valve prevents reverse flow of said hydraulic fluid through said first suction conduit and said second check valve prevents reverse flow of hydraulic fluid through said second suction conduit;
    a first deliver/return conduit and a second delivery/return conduit for delivering said hydraulic fluid from said reservoir to said actuator mechanism, wherein the direction of rotation of said motor determines whether said hydraulic fluid is delivered through said first deliver/return conduit or said second delivery/return conduit;
    a first pressure relief valve and a second pressure relief valve, wherein said first pressure relief valve communicates with said first delivery/return conduit and said second pressure relief valve communicates with said second delivery/return conduit; and means to balance the flow of said hydraulic fluid when said direction of rotation is changed comprising a differential flow control valve.

14. A plural number of hydraulic power systems for operating an actuator mechanism, said hydraulic power systems connected in parallel such that hydraulic fluid can be delivered to said actuator mechanism by one or more of said hydraulic power systems each of said hydraulic power systems comprising:

a reservoir retaining an hydraulic fluid;

an electrically powered reversible motor having a first direction of rotation and a second direction of rotation, wherein said motor is submerged in said hydraulic fluid within said reservoir, said hydraulic fluid acting as a heat dissipater for heat created by said motor;

a pump driven by said motor for removing said hydraulic fluid from said reservoir and delivering said hydraulic fluid to an actuator mechanism;

a first suction conduit and a second suction conduit for removing said hydraulic fluid from said reservoir, wherein the direction of rotation of said motor determines whether said hydraulic fluid is drawn through said first suction conduit or said second suction conduit; and a first deliver/return conduit and a second delivery/return conduit for delivering said hydraulic fluid from said reservoir to said actuator mechanism, wherein the direction of rotation of said motor determines whether said hydraulic fluid is delivered through said first deliver/return conduit or said second delivery/return conduit;

and further wherein each of said hydraulic power systems is controlled by operational control means which determines said direction of rotation of each said motor and determines which of said hydraulic power systems deliver hydraulic fluid to said actuator mechanism, wherein said operational control means comprises a microprocessor.

15. The system of claim 14, each of said hydraulic power systems further comprising a first check valve and a second check valve, wherein said first check valve prevents reverse flow of said hydraulic fluid through said first suction conduit and said second check valve prevents reverse flow of hydraulic fluid through said second suction conduit.

16. The system of claim 15, each of said hydraulic power systems further comprising pressure relief means to release hydraulic fluid into said reservoir if said system is over-pressurized, wherein said pressure relief means comprises a first pressure relief valve and a second pressure relief valve, wherein said first pressure relief valve communicates with said first delivery/return conduit and said second pressure relief valve communicates with said second delivery/return conduit.

17. The system of claim 16, each of said hydraulic power systems further comprising means to balance the flow of said hydraulic fluid when said direction of rotation is changed, wherein said means to balance flow comprises a differential flow control valve.

18. The system of claim 14, wherein said reservoir of each of said hydraulic power units is a single reservoir shared by each of said hydraulic power systems.

* * * * *